US006214211B1

(12) United States Patent
Itoh

(10) Patent No.: US 6,214,211 B1
(45) Date of Patent: Apr. 10, 2001

(54) CATALYTIC CRACKING CATALYST

(75) Inventor: Toshio Itoh, Sodegaura (JP)

(73) Assignee: Idemitsu Kosan Co., LTD, Tokyo (JP)

(*) Notice: Subject to any disclaimer, the term of this patent is extended or adjusted under 35 U.S.C. 154(b) by 0 days.

(21) Appl. No.: 09/292,610

(22) Filed: Apr. 15, 1999

(30) Foreign Application Priority Data

Apr. 21, 1998 (JP) .................................................. 10-110398

(51) Int. Cl.[7] .................................................... C10G 11/02
(52) U.S. Cl. ........................ 208/118; 208/121; 208/122; 502/60; 502/64; 502/65; 502/68; 502/79
(58) Field of Search .................................. 502/60, 64, 63, 502/65, 68, 79; 208/118, 121, 122

(56) References Cited

U.S. PATENT DOCUMENTS

| 4,010,116 | 3/1977 | Secor et al. . |
| 4,326,993 | 4/1982 | Chester et al. . |

FOREIGN PATENT DOCUMENTS

| 236548A1 | 9/1987 | (EP) . |
| 837118A2 | 4/1998 | (EP) . |
| WO95/30725 | 11/1995 | (WO) . |

OTHER PUBLICATIONS

*Ullmann's Encyclopedia of Industrial Chemistry*, 5th Rev. Ed. (1985), pp. 557ff.

*Primary Examiner*—Tom Dunn
(74) *Attorney, Agent, or Firm*—Antonelli, Terry, Stout & Kraus, LLP

(57) ABSTRACT

A catalytic cracking catalyst composition comprising (a) a spherical boehmite gel alumina, (b) a zeolite, (c) a clay mineral and (d) a binder; a catalytic cracking catalyst produced by spray-drying a slurry containing the catalytic cracking catalyst composition to obtain a spherical catalyst, and then calcining the spherical catalyst; a method of catalytically cracking a heavy oil comprising catalytically cracking a heavy oil in the presence of the catalytic cracking catalyst.

21 Claims, No Drawings

CATALYTIC CRACKING CATALYST

BACKGROUND OF THE INVENTION (a) Field of the Invention

The present invention relates to a catalytic cracking catalyst composition useful for the catalytic cracking of heavy oils, and also to a catalytic cracking catalyst and a method of catalytically cracking heavy oils by using the catalytic cracking catalyst.

(b) Description of the Related Art

As crude oils are becoming heavier and the demand for gasoline and light fuel oils is increasing, the catalytic cracking of heavy oils is acquiring greater importance. In these circumstances, there is a demand for new catalytic cracking catalysts, which can crack heavy oils, such as desulfurized heavy oils, and give increased yields of gasoline and LCO fractions (light fuel fractions).

Cracking heavy oils, such as desulfurized heavy oils, into LCO fractions (light fuel fractions) or gasoline fractions requires rough cracking in macro pores (large pores) followed by more efficient cracking in meso pores (medium pores: 40–400 Å).

When a catalyst poor in meso pores is used, heavy oil fractions resulting from the primary cracking cannot penetrate into the area abounding cracking active sites, but stay in macro pores for a long time to form large amounts of coke and gas, failing to use the catalyst effectively. Increasing meso pores (medium pores: 40–400 Å), therefore, is required to crack efficiently the heavy oil fractions resulting from the primary cracking.

A means of increasing meso pores is the use of silica. Silica improves the diffusion of heavy oils, but hardly effects cracking into LCO and gasoline owing to the scarcity of cracking active sites. Another means is the use of silica alumina. Using silica.alumina alone, however, causes excessive cracking of heavy oils, increase the yields of gas and coke owing to a large quantity of strongly acidic cracking active sites. To produce LCO and FCC gasoline, it is therefore necessary to control meso pores and prevent excessive cracking by adding alumina, which is a relatively weak acid.

Japanese Patent Application Examined Publication No. 63-36291 (1988) discloses a hydrocarbon cracking composition containing spray-dried ω alumina. It, however, is unsuitable for the production of LCO and gasoline from heavy oils, such as desulfurized heavy oils because the objective pores are not meso pores but macro pores of 1000–3000 Å, and χ alumina is not a boehmite gel alumina.

Japanese Patent Application Unexamined Publication No. 2-277548 (1990) discloses a catalytic cracking catalyst containing bayerite and/or η alumina, but does not mention meso pores. Further, bayerite and η alumina transfer to θ alumina having a decreased surface area at high temperatures in the regenerators of residual oil fluidized catalytic cracking apparatuses for treating heavy oils, such as desulfurized heavy oils, to decrease the yields of LCO and gasoline fractions.

SUMMARY OF THE INVENTION

An object of the present invention is to provide a catalytic cracking catalyst, which is useful for the catalytic cracking of heavy oils, such as desulfurized heavy oils, and affords high yields of gasoline and LCO and low yields of coke and gas.

Another object of the present invention is to provide a method of catalytic cracking heavy oils by using the catalytic cracking catalyst, which affords high yields of gasoline and LCO and low yields of coke and gas.

We have studied to solve the above problems and have found that high yields of gasoline and LCO and low yields of coke and gas can be afforded by cracking heavy oils by using a catalytic cracking catalyst produced from a catalytic cracking catalyst composition containing spherical boehmite gel alumina. We have completed the present invention on the basis of the finding.

That is, the present invention provides a catalytic cracking catalyst composition comprising (a) a spherical boehmite gel alumina, (b) a zeolite, (c) a clay mineral and (d) a binder.

The present invention further provides a catalytic cracking catalyst produced by spray-drying a slurry containing the catalytic cracking catalyst composition to obtain a spherical catalyst, and calcining the spherical catalyst.

The present invention further provides a method of catalytically cracking a heavy oil, which comprises catalytically cracking a heavy oil in the presence of the catalytic cracking catalyst.

DESCRIPTION OF THE PREFERRED EMBODIMENTS

The (a) spherical boehmite gel alumina contained in the catalytic cracking catalyst composition of the present invention is preferably produced by spray-drying a slurry of boehmite gel. For example, to produce the spherical boehmite gel alumina, first, alumina gel is precipitated by the neutralization reaction of an aqueous aluminum sulfate solution with aqueous ammonia, or of an aqueous sodium aluminate solution with a mineral acid, such as sulfuric acid or nitric acid, or of an aqueous aluminum sulfate solution with an aqueous sodium aluminate solution. The alumina gel is filtered and washed to remove sodium ion and sulfuric aci ion, to obtain alumina gel (boehmite gel) cake. Ion-exchanged water is added to the alumina gel cake to form a slurry of a solid content of 5–30 wt %, which is then spray-dried at a temperature of 100–250° C. to give spherical boehmite gel alumina. Examples of commercially available, spherical boehmite gel alumina include VERSAL 150, VERSAL 250, VERSAL 450 and VERSAL 900 (trade name).

The spherical boehmite gel alumina produced by spray-drying a slurry of boehmite gel preferably has a particle size of 0.2–150 µ, more preferably 0.2–80 µm. The spherical boehmite gel alumina preferably has a single pore size peak in the range of 50–300 Å.

Preferred examples of the (b) zeolite contained in the catalytic cracking catalyst composition of the present invention include USY-zeolite, REY-zeolite which is an ion-exchanging product of NaY-zeolite with a rare earth element, and REUSY-zeolite obtainable by steaming REY-zeolite. The zeolite preferably has a specific surface area of 300–1,000 $m^2$/g, more preferably 400–900 $m^2$/g.

Preferred examples of the (c) clay mineral contained in the catalytic cracking catalyst composition of the present invention include kaolin and bentonite.

Preferred examples of the (d) binder contained in the catalytic cracking catalyst composition of the present invention include silica sol, alumina sol and silica.alumina sol.

The catalytic cracking catalyst composition of the present invention may contain silica.alumina when necessary. The ratio of silica/alumina in the silica.alumina is preferably 5/95 to 80/20 (wt/wt), more preferably 10/90 to 70/30 (wt/wt). Silica.alumina with higher silica ratios cannot have pores of large size in the product catalyst, or may broaden the pore size distribution of the product catalyst, inhibiting heavy oils from penetrating into pores.

A particular example of the preparation of silica.alumina is described hereinafter. JIS No. 3 water glass ($SiO_2$ content: 28 wt %) is diluted with ion-exchanged water to prepare an aqueous solution containing 4.0–12.0 wt % of $SiO_2$. Aluminum sulfate 14 hydrate is diluted with ion-exchanged water to prepare an aqueous solution containing 4.0–12.0 wt % of aluminum sulfate. The same amounts of the aqueous water glass solution and the aqueous aluminum sulfate solution are added alternately to ion-exchanged water 0 to 10 times. When the aqueous water glass solution is added, the solution mixture is adjusted to pH 10 or higher. Basic agents, such as ammonia or sodium hydroxide, may be added to adjust the pH when necessary. When the aqueous aluminum sulfate solution is added, the solution mixture is adjusted to pH 4–8. Acidic or basic agents may be added to adjust the pH when necessary.

After the reaction, precipitate is filtered, and the residue on the filter is dispersed in an aqueous ammonium nitrate solution, subsequently in ion-exchanged water, and is filtered again to remove residual sodium. After the procedure is repeated 3 to 6 times, the resulting filter cake is washed with ion-exchanged water. When used as a material for the preparation of catalytic cracking catalysts, the filter cake containing water may be used as it is, or may be used after being dried at 60–200° C. for 1–12 hours, followed by optional calcination at 300–900° C. for 1 to 12 hours and optional grinding to a mean particle size of 0.2–5 μm.

The catalytic cracking catalyst composition preferably contains 2–30 wt %, more preferably 2–20 wt % of the (a) spherical boehmite gel alumina, 10–40 wt %, more preferably 15–40 wt % of the (b) zeolite, 10–60 wt %, more preferably 15–50 wt % of the (c) clay mineral, 10–30 wt %, more preferably 15–25 wt % of the (d) binder, and 0–30 wt %, more preferably 0–20 wt % of the (e) silica.alumina.

The catalytic cracking catalyst of the present invention is prepared by spray-drying a slurry containing the catalytic cracking catalyst composition of the present invention to obtain a spherical catalyst, then calcining the spherical catalyst.

For example, the catalytic cracking catalyst of the present invention may be prepared as described below. The (a) spherical boehmite gel alumina, the (b) zeolite, the (c) clay mineral, the (d) binder and the optional (e) silica.alumina are mixed with ion-exchanged water to form a slurry, which preferably has a solid concentration of 5–25 wt %. Preferably, the spherical boehmite gel alumina, the zeolite, the clay mineral and the silica.alumina are previously ground to 0.2–5 μm. The slurry is preferably adjusted to pH 3–9.

The slurry is spray-dried preferably at 100–300° C. by common means, to give a spherical catalyst of preferably 20–150 μm, more preferably 30–120 μm in diameter, which is then dried at 80–200° C. and calcined at 200–500° C. for 0.5–5 hours, to give the objective catalytic cracking catalyst. The catalytic cracking catalyst may be steamed when necessary.

The (a) spherical boehmite gel alumina in the catalytic cracking catalyst preferably transfers to δ-crystal form or a mixture of δ-crystal form and γ-crystal form when the catalytic cracking catalyst is used as a catalyst in a catalytic cracking reaction, namely under the operation conditions for practical cracking apparatuses.

The catalytic cracking catalyst preferably contains 2–30 wt %, more preferably 2–20 wt % of the (a) spherical boehmite gel alumina, 10–40 wt %, more preferably 15–40 wt % of the (b) zeolite, 10–60 wt %, more preferably 15–50 wt % of the (c) clay mineral, 10–30 wt %, more preferably 15–25 wt % of the (d) binder, and 0–30 wt %, more preferably 0–20 wt % of the (e) silica.alumina.

If the (a) spherical boehmite gel alumina is less than 2 wt %, meso pores necessary for cracking heavy oils may be insufficient, and if more than 30 wt %, the cracking sites (zeolite) for cracking the roughly cracked raw oil into gasoline and LCO may be insufficient for obtaining the objective products. If the (b) zeolite is less than 10 wt %, the yields of gasoline and LCO may decrease due to the scarcity of cracking sites, and if more than 40 wt %, the yields of gas and coke may increase due to excessive cracking. If the (c) clay mineral is less than 10 wt %, the yields of gasoline and LCO may decrease, and if more than 60 wt %, the yields of gasoline and LCO may decrease due to the scarcity of other effective components. If the (d) binder is less than 10 wt %, the catalyst may be fragile due to poor mechanical strength, and if more than 30 wt %, the yields of gasoline and LCO may decrease due to the scarcity of other effective components.

As to the pore size distribution of the thus obtained catalytic cracking catalyst (as measured by Mercury Injection Method), the volume of pores of 40–400 Å is preferably 15–45%, more preferably 20–40%, based on the volume of pores of 40–18,000 Å. If it is less than 15%, the yields of the objective gasoline and LCO fractions may decrease. If it is more than 45%, the yields of gasoline and LCO may also decrease due to the scarcity of cracking sites (zeolite).

Non-limitative examples of heavy oils applicable for the catalytic cracking using the catalytic cracking catalyst of the present invention include desulfurized heavy oils and non-desulfurized heavy oils. The catalytic cracking is preferably carried out at a reaction temperature of 450–550° C. at a catalyst/heavy oil ratio of 3–10 (wt/wt). The temperature in regenerators is preferably 600–850° C.

The reaction apparatus and reaction system to be employed for the catalytic cracking catalyst of the present invention are not particularly limited, and may be selected from those conventionally used for the catalytic cracking of heavy oils. For example, various apparatuses and systems, such as fixed bed, moving bed and fluidized bed (FCC, RFCC) are applicable.

The present invention will be described in more detail with reference to the following Examples. These Examples, however, are not to be construed to limit the scope of the invention.

EXAMPLES 1–3 AND COMPARATIVE EXAMPLES 1–3

Example 1

(1) Preparation of Catalyst 10 wt % of a spray-dried boehmite gel alumina (trade name: VERSAL 250) based on the weight of the product catalys (the same shall apply hereinafter), 5 wt % of silica.alumina with a pore size peak at 100 Å, 30 wt % of USY-zeolite (trade name: HSZ-330HUA, produced by Toso Co., Ltd.), 35 wt % of kaolin (a clay mineral produced by Tsuchiya Kaolin Kogyo Co., Ltd., trade name; ASP-170) and 20 wt % of silica sol as $SiO_2$ were added to ion-exchanged water, to give a slurry with a solid content of 15 wt %. The slurry was spray-dried under the conditions of a temperature of 250° C., a rotation rate of the disc of a spray dryer of 9000 rpm and a slurry feed rate of 10 cc/min, to give a spherical catalytic cracking catalyst of 20–120 μm in diameter. Previous to the mixing and spray-drying, the alumina, silica.alumina, zeolite and kaolin had been wet-ground to 2.1 μm in mean particle size. The spherical catalytic cracking catalyst (RFCC catalyst) was then calcined at 200° C. for 3 hours in an electric calcining furnace. The pore size distribution of the starting spherical boehmite gel alumina measured with an apparatus for measuring pore size distribution using mercury indicated a single peak at 100 Å.

The pore size distribution of the catalyst was measured with a porosimeter (AUTOPORE II 9220, produced by Micro Meritics Co., Ltd.). The pore size distribution in the range of 40 to 18,000 Å was measured at a contact angle of mercury of 130° at a surface tension of mercury of 484 dyn/cm, to obtain the percentage of meso pores of 40–400 Å. The results are given in Table 2.

(2) Pretreatment of Catalyst, Evaluation of Catalytic Reaction with an MAT (micro-activity testing apparatus, ASTM MAT D3907, Evaluation of Petroleum Hydrocarbon Cracking Activity of Catalysts)

80 g of the catalyst was steamed for 15 hours at 770° C., at a steam concentration of 98 vol %, at an air concentration of 2 vol %, at an ion-exchanged water feeding rate of 0.415 g/min. 50 g of the catalyst was then loaded with 1400 ppm of V and 700 ppm of Ni by using vanadium naphthenate and nickel naphthenate, and pseudo-equilibrated by steaming for 4 hours at 720° C., at a steam concentration of 20 vol % and at an air concentration of 80 vol %, and then 4 hours at 850° C., at a steam concentration of 5 vol % and at an air concentration of 95 vol %.

The reaction evaluation with an MAT apparatus was carried out at 550° C. by using 5 g of the pseudo-equilibrium catalyst and a raw material oil that was a desulfurized heavy oil (Arabian heavy/Arabian light=50 vol/50 vol). The properties of the raw material oil are given in Table 1, and the reaction results in Table 2.

Example 2

The procedure of Example 1 was repeated except that, in the preparation of catalyst, the amount of the spray-dried boehmite gel alumina was changed to 30 wt %, and the amount of the kaolin (clay mineral) to 15 wt %. The pore size distribution of the catalyst obtained in Example 2 is given in Table 2.

Example 3

The procedure of Example 1 was repeated except that, in the preparation of catalyst, the amount of the spray-dried boehmite gel alumina was changed to 2 wt %, and the amount of the kaolin (clay mineral) to 43 wt %. The pore size distribution of the catalyst obtained in Example 3 is given in Table 2.

Comparative Example 1

The procedure of Example 1 was repeated except that, in the preparation of catalyst, the spray-dried boehmite gel alumina used in Example 1 was replaced by 10 wt % (percentage in the product catalyst) of a material that was obtained by calcining a cake of conventional boehmite gel precipitate resulting from the neutralization reaction of aluminum sulfate with sodium aluminate and wet-grinding the calcined cake to a mean particle size of 2.0 μm.

Comparative Example 2

The procedure of Example 1 was repeated except that, in the preparation of catalyst, the spray-dried boehmite gel alumina used in Example 1 was replaced by a spray-dried bayerite alumina.

Comparative Example 3

The procedure of Example 1 was repeated except that, in the preparation of catalyst, the spray-dried boehmite gel alumina was not used, and that the amount of the silica.alumina used in Example 1 was changed from 5 wt % to 15 wt %.

TABLE 1

| Item | Measured value |
|---|---|
| Specific gravity @ 15° C. | 0.927 |
| Sulfur content (wt %) | 0.3 |
| Content of residual carbon (wt %) | 4.0 |
| Metal content | |
| V (ppm) | 9 |
| Ni (ppm) | 6 |

TABLE 2

| | Examples | | | Comparative Examples | | |
|---|---|---|---|---|---|---|
| | 1 | 2 | 3 | 1 | 2 | 3 |
| Spray-dried boehmite gel alumina (wt %) | 10 | 30 | 2 | 0 | 0 | 0 |
| Volume of pores of 40–400 Å (%) | 30 | 40 | 20 | 10 | 10 | 20 |
| Reaction results | | | | | | |
| FCC gasoline+LCO (wt %) | 64.0 | 63.5 | 63.0 | 59.4 | 58.2 | 57.6 |
| Coke (wt %) | 7.0 | 7.6 | 7.4 | 8.5 | 5.9 | 9.3 |

The results given in Table 2 indicate that when used in the catalytic cracking of heavy oils, such as desulfurized heavy oils, the catalytic cracking catalyst of the present invention give high yields of gasoline and LCO and low yields of coke and gas.

What is claimed is:

1. A catalytic cracking catalyst which is produced by spray-drying a slurry containing a catalytic cracking catalyst composition to obtain a spherical catalyst, and calcining the spherical catalyst, wherein the catalytic cracking catalyst composition comprises (a) a spherical boehmite gel alumina, (b) a zeolite, (c) a clay mineral and (d) a binder, and wherein the catalytic cracking catalyst has 15 to 45 vol % of pores of 40 to 400 Å based on a volume of pores of 40 to 18,000 Å.

2. The catalytic cracking catalyst of claim 1, wherein the spherical boehmite gel alumina is produced by spray-drying a slurry of boehmite gel.

3. The catalytic cracking catalyst of claim 1, wherein the spherical boehmite gel alumina has a single pore size peak in a range of 50 to 300 Å.

4. The catalytic cracking catalyst of claim 1, wherein the zeolite is a USY-zeolite, an REY-zeolite or an REUSY-zeolite.

5. The catalytic cracking catalyst of claim 1, which comprises (a) 2 to 30 wt % of the spherical boehmite gel alumina, (b) 10 to 40 wt % of the zeolite, (c) 10 to 60 wt % of the clay mineral, (d) 10 to 30 wt % of the binder and (e) 0 to 30 wt % of a silica.alumina.

6. A catalytic cracking catalyst, which is formed by steaming the catalytic cracking catalyst of claim 1, and contains spherical boehmite gel alumina which has been transferred into δ-crystal form or into a mixture of δ-crystal form and γ-crystal form.

7. The catalytic cracking catalyst of claim 1, wherein when the catalytic cracking catalyst is used as a catalyst in a catalytic cracking reaction, the spherical boehmite gel alumina transfers into δ-crystal form or a mixture of δ-crystal form and γ-crystal form.

8. The catalytic cracking catalyst of claim 1, having used such a spherical boehmite gel alumina that, in catalytically cracking a heavy oil in the presence of the catalyst, there are relatively high yields of gasoline and light fuel fractions and relatively low yields of coke and gas.

9. The catalytic cracking catalyst of claim 1, wherein the spherical boehmite gel alumina has a particle size of 0.2 to 150 μm.

10. The catalytic cracking catalyst of claim 1, wherein the spherical boehmite gel alumina has a particle size of 0.2 to 80 μm.

11. The catalytic cracking catalyst of claim 1, wherein the zeolite has a specific surface area of 300 to 1,000 $m^2/g$.

12. The catalytic cracking catalyst of claim 1, wherein the zeolite has a specific surface area of 400 to 900 $m^2/g$.

13. The catalytic cracking catalyst of claim 1, which comprises 2 to 20 wt % of the spherical boehmite gel alumina, 15–40 wt % of the zeolite, 15–50 wt % of the clay mineral, 15–25 wt % of the binder and 0–20 wt % of silica.alumina.

14. The catalytic cracking catalyst of claim 1, which has 20 to 40 vol % of pores of 40 to 400 Å based on a volume of pores of 40 to 18,000 Å.

15. The catalytic cracking catalyst of claim 1, which consists essentially of 2 to 20 wt % of the spherical boehmite gel alumina, 15–40 wt % of the zeolite, 15–50 wt % of the clay mineral, 15–25 wt % of the binder and 0–20 wt % of silica.alumina.

16. A catalytic cracking catalyst, which is derived from the catalytic cracking catalyst of claim 1, and contains spherical boehmite gel alumina which has been transferred into δ-crystal form or into a mixture of δ-crystal form and γ-crystal form.

17. The catalytic cracking catalyst of claim 1, wherein the spherical catalyst has a diameter of 20–150 μm.

18. The catalytic cracking catalyst of claim 17, wherein the spherical catalyst has a diameter of 30–120 μm.

19. A method of catalytically cracking a heavy oil comprising catalytically cracking a heavy oil in the presence of the catalytic cracking catalyst of any one of claims 1, 5, or 7.

20. The method of claim 19, wherein the catalytic cracking is carried out at a reaction temperature of 450 to 550° C. and at a ratio of the catalytic cracking catalyst/the heavy oil (wt/wt) of 3–10.

21. The method of claim 19, wherein the heavy oil is a desulfurized heavy oil or a non-desulfurized heavy oil.

* * * * *

UNITED STATES PATENT AND TRADEMARK OFFICE
CERTIFICATE OF CORRECTION

PATENT NO.    : 6,214,211 B1
DATED         : April 10, 2001
INVENTOR(S)   : Toshio Itoh It is certified that error appears in the above-identified patent and that said Letters Patent is hereby corrected as shown below:

Title page,
Item [73], Assignee, replace "Idemitsu Kosan Co., LTD. Tokyo (JP)" with
-- Idemitsu Kosan Co., Ltd., Tokyo (JP) and Petroleum Energy Center, Tokyo (JP) --.

Signed and Sealed this

Twenty-fourth Day of August, 2004

JON W. DUDAS
*Director of the United States Patent and Trademark Office*